UNITED STATES PATENT OFFICE.

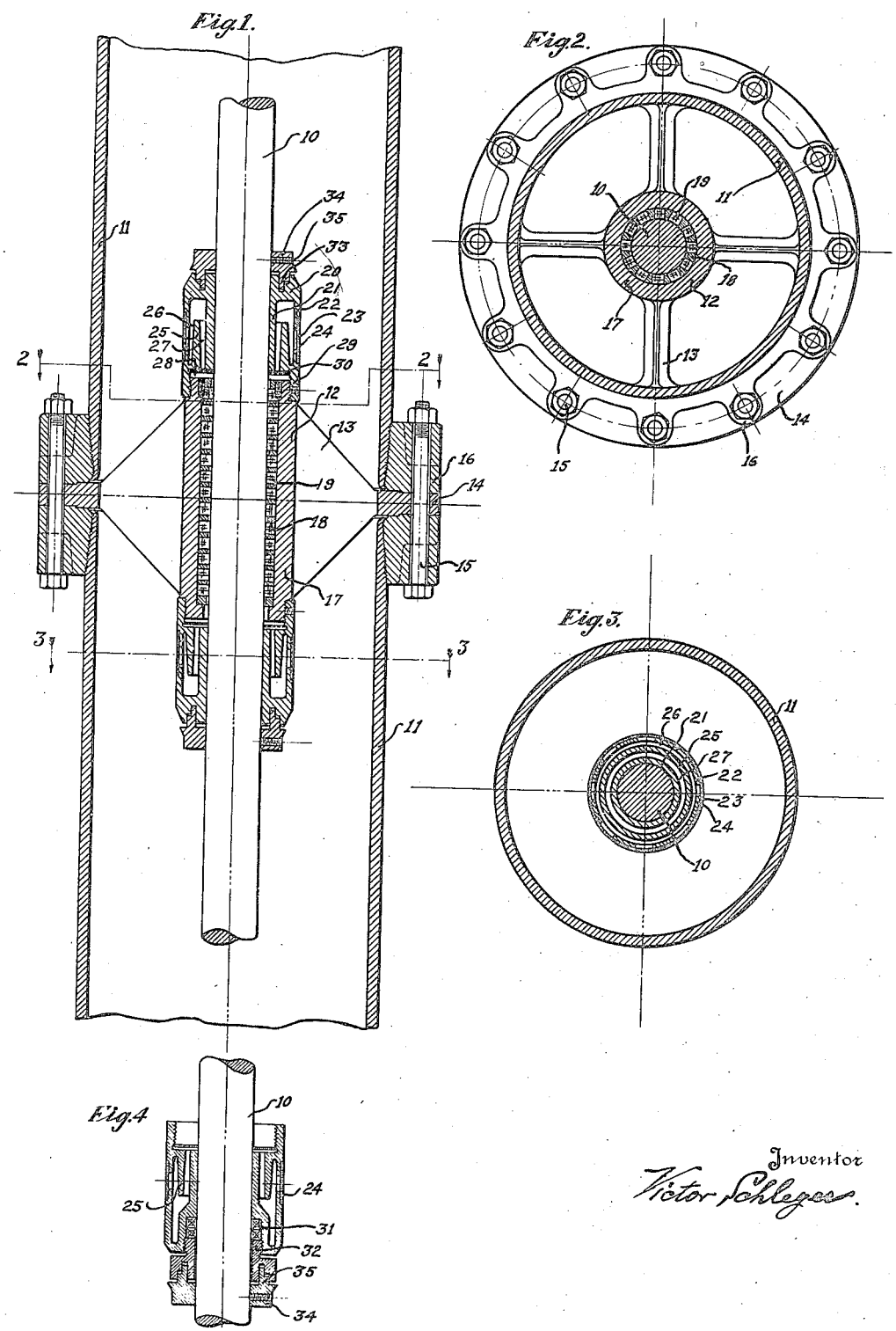

VICTOR SCHLEYER, OF ANDERSON, INDIANA, ASSIGNOR TO MIDWEST ENGINE COMPANY, OF INDIANAPOLIS, INDIANA, A CORPORATION OF INDIANA.

SAND-PROTECTED BEARING FOR DEEP-WELL PUMPS.

1,404,698.           Specification of Letters Patent.    Patented Jan. 24, 1922.

Application filed August 19, 1920. Serial No. 404,576.

*To all whom it may concern:*

Be it known that I, VICTOR SCHLEYER, a citizen of the United States, residing at Anderson, in the county of Madison and State of Indiana, have invented a new and useful Sand-Protected Bearing for Deep-Well Pumps, of which the following is a specification.

In the operation of deep-well pumps in which a shaft extends down into the well to operate a pump at the lower end of such shaft much trouble is caused by sand and dirt in the bearings, as the water often carries with it great masses of sand and dirt, which rise with the water during pump operation and settle downward when the pump stops. This often results in the destruction of the bearings and of the shaft at the bearings in a very short time, requiring replacements at great expense.

It is the object of my present invention to produce a sand-protected bearing, which will keep out the sand and dirt from the bearing but will permit water filtered from sand to flow through the bearing to lubricate it.

The accompanying drawing illustrates my invention; Fig. 1 is a fragmentary vertical central section through a deep well pump-shaft bearing embodying my invention, showing the bearing complete and fragments of the shaft and the surrounding water-carrying pipe; Fig. 2 is a transverse section on the line 2—2 of Fig. 1; Fig. 3 is a transverse section on the line 3—3 of Fig. 1; and Fig. 4 is a fragmentary axial section through a modified bearing cap.

The vertical shaft 10 which operates the pump in the well extends in the usual manner through the pipe 11 which carries upward the water discharged from such pump. The shaft is centered within the pipe 11 by bearings 12, to which my invention relates.

The bearing 12 is supported by a spider 13, having a circumferential ring 14 which is clamped by bolts 15 between the outwardly extending lugs on two rings 16 having pipe-thread mountings on the adjacent ends of two sections of the pipe 11. The center part of the bearing 12, constituting the bearing portion thereof, may be of any suitable construction, being shown as formed of an outer sleeve 17 within which is a perforated sleeve 18 having formed through it suitable perforations, usually staggered, in which are located wooden plugs 19 which bear against the surface of the shaft 10 and provide suitable spaces between them for the passage of water for lubricating the bearing; this center bearing portion is shown of a standard construction, and may be varied if desired.

On each end of the sleeve 17 is screwed a cap 20. This cap is formed with an internal sleeve 21 closely fitting the shaft 10, and an external sleeve 22 provided with an annular series of holes 23 over which lies a band screen 24 set in a suitable circumferential recess in the outside surface of the sleeve 22. Between the two sleeves 21 and 22 is a baffle ring 25 spaced from both sleeves except at the end toward the bearing sleeve 17, where it joins the sleeve 22. This provides an annular space 26 with which the holes 23 communicate, and an annular space 27 which communicates around the free end of the baffle ring 25 with the space 26 and also communicates with a space 28 formed within the cap 20 at the base of the screw flange 29 by which it is attached to the sleeve 17. Set in the space 28, with its outer edge held in a suitable recess on the inner face of the flange 29, is a screen 30, which thus lies between the space 27 and the bearing plugs 19. Thus two screens 23 and 30 lie between the water in the pipe 11 and each end of the sleeves 17 and 18, and between these two screens and the end there is a winding passageway. The screens 23 and 30 are of suitable mesh for the sand or dirt to encounter.

The outer end of each cap 20 may if desired have a suitable packing 31 held by a packing ring 32, as shown in Fig. 4; but this is not essential. The outer end of the cap 20 or of the packing ring 32 is provided with an annular stepped groove, in which fits a similarly stepped flange 33 projecting axially from a ring 34 clamped to the shaft 10 by a set screw 35. The flange 33 fits within its groove, and the sleeve 21 fits upon the shaft 10, with sufficient closeness to prevent the passage therebetween of sand or dirt carried by the water traveling through the pipe 11.

In operation, the sand-carrying water which rises through the pipe 11 passes around the outside of the sleeve 17, and across the outer surfaces of the screens 23 at the top and bottom of the bearing. The pressures at the two screens 23 are slightly different, and as a result water enters through one of these screens and passes out through the other, with a comparatively slow movement through the screens and the bearing. The water which enters through one screen 23 is freed from sand and dirt by such screen and by the comparatively slow movement of the water through the screen. This water travels through the winding passage formed by the spaces 26 and 27 into the space 28, where it encounters the screen 30, which removes any remaining sand or dirt. The substantially sand-free water which passes the screen 30 then passes through the bearing proper, formed by the wooden plugs 19, so that such plugs are lubricated by filtered water. After passing the plugs 19, the water passes out through the cap 20 at the other end, by a path just the reverse of that by which it entered through the first cap.

By reason of the screens and winding passages provided, it is found that the bearing proper is kept substantially free from sand and dirt, both during pump operation and during settling, and that its life is increased many times.

I claim as my invention:

1. A sand-protected bearing for shafts of deep-well pumps, comprising a bearing sleeve in which the shaft is journaled, and a cap mounted on each end of the bearing sleeve and provided with a winding passageway having therein one or more screens and connecting the end of the bearing sleeve with the space outside the bearing.

2. A sand-protected bearing for shafts of deep-well pumps, comprising a bearing sleeve in which the shaft is journaled, and end portions at the respective ends of said sleeve, said end portions being provided with circumferentially extending passages and a baffle ring over one end of which ring said circumferentially extending passages are connected, one of said passages communicating with the end of said bearing sleeve and the other being provided with a plurality of small holes opening to the outside.

3. A sand-protected bearing for shafts of deep-well pumps, comprising a bearing sleeve in which the shaft is journaled, end portions at the respective ends of said sleeve, said end portions being provided with circumferentially extending passages and a baffle ring over one end of which ring said circumferentially extending passages are connected, one of said passages communicating with the end of said bearing sleeve and the other being provided with holes opening to the outside, and a screen over said holes.

4. A sand-protected bearing for shafts of deep-well pumps, comprising a bearing sleeve in which the shaft is journaled, end portions at the respective ends of said sleeve, said end portions being provided with circumferentially extending passages and a baffle ring over one end of which ring said circumferentially extending passages are connected, one of said passages communicating with the end of said bearing sleeve and the other being provided with holes opening to the outside, a screen over said holes, and a second screen between the first of said passages and the adjacent end of the bearing sleeve.

5. A sand-protected bearing for shafts of deep-well pumps, comprising a bearing sleeve in which the shaft is journaled, a cap on each end of said sleeve, each cap being provided with two annular passages one inside of the other, said two passages communicating with each other at their ends remote from their bearing sleeve and also communicating respectively with the end of the bearing sleeve and with the outside, and a screen lying within said cap between the end of the bearing sleeve and the passageway which communicates with it.

6. A sand-protected bearing for shafts of deep-well pumps, comprising a bearing sleeve in which the shaft is journaled, and end portions having passages communicating with the ends of the bearing sleeve and with the outside respectively, and a screen through which water traveling through such passages must pass.

In witness whereof I have hereunto set my hand at Anderson, Indiana, this 16th day of August, A. D. one thousand nine hundred and twenty.

VICTOR SCHLEYER.